United States Patent Office 2,693,481
Patented Nov. 2, 1954

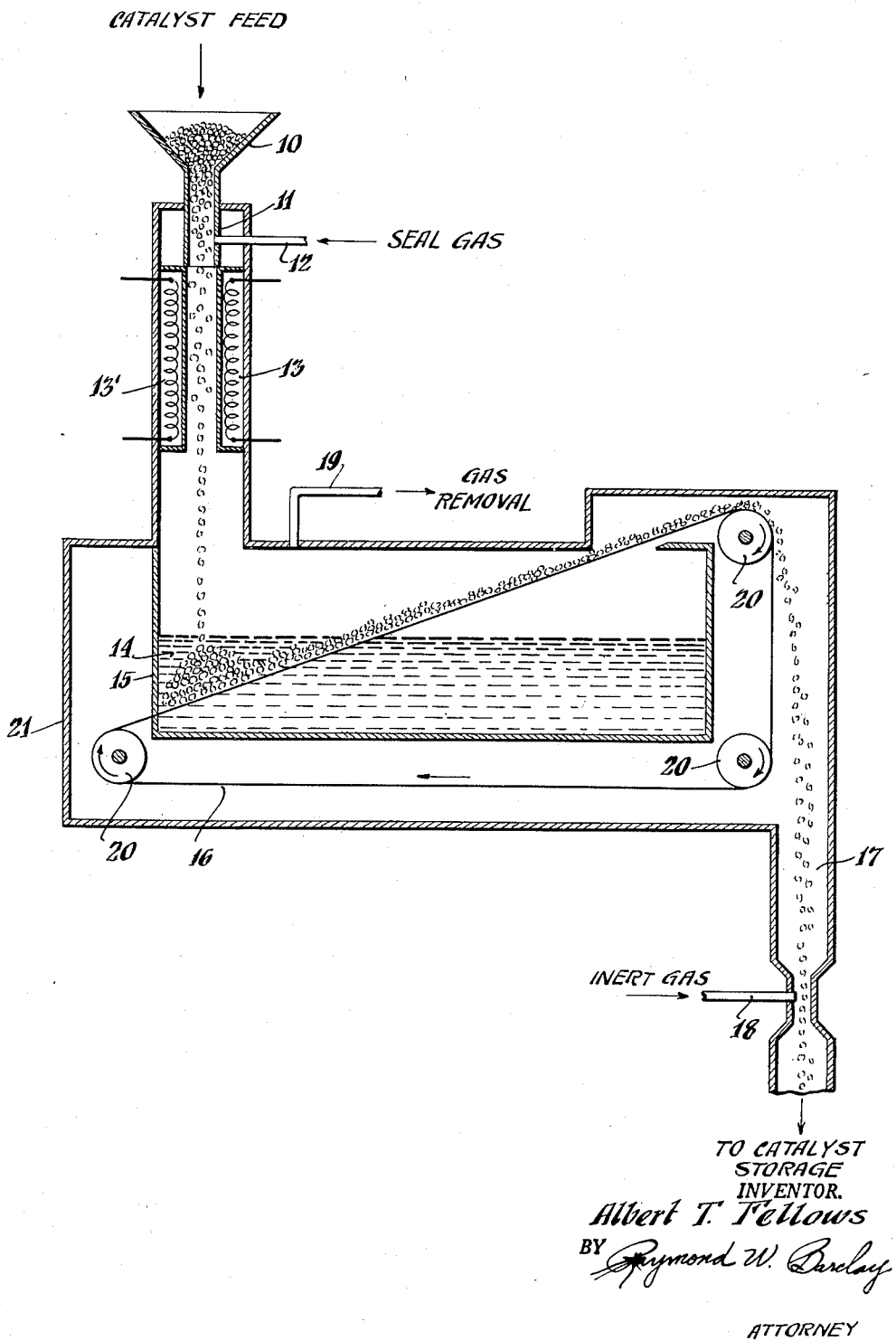

2,693,481

METHOD FOR CONDITIONING METAL OXIDE CATALYSTS

Albert T. Fellows, Woodbury, N. J., assignor to Socony-Vacuum Oil Company, Incorporated, a corporation of New York Application December 8, 1950, Serial No. 199,842

18 Claims. (Cl. 260—449.6)

This invention relates to an improved process for conditioning metal oxides which are catalytically active in the conversion of carbon monoxide-hydrogen mixtures to normally liquid hydrocarbons and oxygenated organic compounds. More specifically, the present invention is concerned with a method for conditioning a catalyst made up largely of an oxide of a ferromagnetic metal, that is, an oxide of iron, cobalt, or nickel. In particular, the method described herein is directed to conditioning catalysts having an iron oxide base.

The catalytic production of hydrocarbon and/or oxygenated organic compounds from CO and $H_2$ is commonly referred to as Fischer-Tropsch synthesis. Catalysts useful in said synthesis are conventionally subjected to conditioning before effecting the desired conversion. Heretofore, the catalyst, initially in the form of a metal oxide, has been conditioned by substantially completely reducing to the metallic state with reducing gases under temperature conditions such that sintering is minimized. The reduction is typically carried out by passage of hydrogen or hydrogen-rich gas through the oxide at temperatures of the order of 300–550° C. or higher, the duration of such treatment and the space velocity utilized being varied over wide limits. For the usual type of fused magnetite base catalyst containing minor proportions of potassium oxide and aluminum oxide as promoters, a temperature of about 450° C. and a hydrogen space velocity of about 2000 volumes per hour per volume of catalyst will lead to about 90 per cent reduction of the iron oxide after approximately 50 hours treatment. The second phase of the conditioning usually involves passage of the synthesis gas mixture of hydrogen and carbon monoxide over the previously reduced catalyst at increasing temperatures until synthesis activity is obtained. This stage, generally considered as a carbiding operation, may be regarded either as a final conditioning or as the initial phase of the synthesis proper. When synthesis gas is used for the initial reduction, this part of the conditioning may be simultaneous with the reduction.

Catalyst conditioning methods of the foregoing type have the disadvantages of being time-consuming, tedious, and relatively expensive to operate. Thus, process times in the range of 10 to 50 hours or greater have been required. The method due to its inherent nature has necessarily been carried out as a batch operation and the process cost has been high, since reduction equilibria limits consumption to a minor fraction of the hydrogen heated and passed over the oxide, i. e., 13 per cent of the hydrogen at 450° C. In practice even this low conversion is seldom attained because of the need for high hydrogen space velocities, normally of the order of 2,000 volumes per hour per volume of catalyst. Furthermore, the hydrogen so used must be purified of its water content before recycling, a process usually accompanied by loss of the sensible heat in the gas, which then necessitates reheating before recycling. The reduced catalysts obtained by these conditioning procedures are generally pyrophoric in nature and consequently are necessarily stored and transferred out of contact with air. An inert gas atmosphere, such as nitrogen or carbon dioxide, is, accordingly, usually required for storage of the reduced catalyst and transfer of the same to the reactors.

It is a major object of this invention to provide a rapid method for conditioning metal oxide catalysts conventionally employed in promoting the conversion of CO and $H_2$ mixtures to hydrocarbons and oxygenated organic compounds. A further object is the provision of a catalyst conditioning process capable of continuous operation. A still further object is to provide an improved, economically attractive method for conditioning catalysts of the above type without entailing the procedural precautions and difficulties which have heretofore been involved in the previously employed methods.

These and other objects which will be apparent to those skilled in the art are achieved in accordance with the method of this invention. Broadly, it has been discovered, in accordance with the present invention, that metal oxide catalysts which are active, after a gaseous reduction, for the conversion of carbon monoxide-hydrogen mixtures into hydrocarbons and oxygenated organic compounds may be conveniently and rapidly conditioned for synthesis activity by the process of heating particles of the catalyst oxide to an elevated temperature and thereafter quenching the hot catalyst oxide with a large volume of a liquid which is thermally decomposed upon contact with the hot solid into gaseous reduction products which serve to form a gaseous envelope around the catalyst particles reducing the outer surface thereof, and thus placing them in condition for catalytically promoting the desired synthesis reactions.

The beneficial effects of liquid quench reduction are obtained as a result of both chemical and physical action. Chemically, the quenching liquid's decomposition products are active reducing agents for the instant the hot solid catalyst particle is in contact with the gaseous envelope of reducing agent. Since the volume of quenching liquid is large relative to the volume of catalyst particles being reduced, the reduction is practically instantaneous and is limited to a relatively small depth of penetration, so that ordinarily only an outer layer of reduced and conditioned surface is obtained, leaving the core of the catalyst particle, which does not participate in the catalysis, undisturbed. Physically, since the solid catalyst oxide is somewhat brittle, the thermal shock, when the solid at elevated temperature strikes the liquid at ambient temperature, effects cracking of the particles both macroscopically and microscopically. Macroscopic cracking has not been found to be serious and where a close particle size range is desired, a larger size oxide may be chosen than that of the final desired reduced catalyst. Microscopic cracking or crazing of the catalyst particles has been found desirable in that the fissures and other irregularities so formed result in the exposure of a more extensive catalyst surface to reducing conditions and consequently afford a larger catalytic surface in the subsequent synthesis reaction.

It is deemed that the thermal shock effects encountered upon quenching the hot catalyst particles are particularly valuable in the conditioning of dense oxides, such as fused oxides or dense ores, for example, the Swedish or Dover, N. J., magnetites, since these dense oxides reduce much more slowly in conventional gaseous reductions than lighter oxides, such as the precipitated hydrous oxides.

The quench reduction liquid employed herein is a liquid capable of yielding a gaseous reducing atmosphere upon thermal decomposition. Quenching media preferably include liquid organic compounds and mixtures of said compounds wherein the atom ratio of hydrogen to carbon does not exceed about 4. Generally, the atom ratio of H to C of the organic quenching liquids employed herein will not be greater than 3. Typical of the liquid organic compounds contemplated for use as quenching liquids are hydrocarbons, alcohols, aldehydes, ethers, ketones, acids, amines, and esters. These compounds may be aliphatic or aromatic in nature and may be either saturated or unsaturated. Liquid mixtures of organic compounds are also suitable for use as quenching media in the instant process. Thus, organic mixtures, such as mineral oils, gasoline, turpentine, and oxygenated organic compound mixtures may be employed with advantage. Representative specific compounds suitable as quench liquids are pentane, benzene, tetralin, hexane, toluene, xylene, ethyl alcohol, isopropyl alcohol, amyl alcohol, acetaldehyde, acetic acid, ethyl benzoate, glycerol, ethylene glycol, acetone, methyl-ethyl ketone, and the like. This list is, of course, not to be construed as limiting since other organic liquids having the above recited characteristics may likewise be employed. Generally the choice of quench liquid will be governed by economic factors and it is, accordingly, ordinarily preferred to employ the less expensive, more readily available organic compounds and mixtures. However, since the essential reaction is a thermal decomposition of the liquid medium brought about by the sensible heat of the catalyst particles undergoing treatment, with formation of an envelope of reducing gases arising from this decomposition, it will be understood that the use of any liquid capable of affording such reducing atmosphere upon thermal decomposition is within the purview of this invention.

The metal oxide catalyst being conditioned in accordance with the present method is initially heated to a minimum temperature, being that temperature which under the conditions effects thermal decomposition of the chosen liquid quench reducing medium and leads to surface alteration of the catalyst activating it for synthesis. This minimum temperature will be dependent on the specific quench liquid chosen and will vary in part with the particular particle size of the catalyst. As a practical matter, however, a temperature of about 900° C. is considered to be the minimum temperature to which the catalyst particles should be initially heated. The higher the temperature of the catalyst oxide before quenching, the higher is the degree of reduction. The maximum temperature to which the catalyst oxide may be heated before quenching is measured by the melting point of the particular metal oxide composition employed. The temperature should not be such as to melt the catalyst. Thus, for a magnetite catalyst, the maximum temperature is about 1500° C. For other metal oxide catalysts, this maximum temperature is correspondingly governed by the particular melting point thereof.

The catalyst oxide, as indicated, is suitably present in particle form during treatment. The particle size may be varied over wide limits, depending largely upon the nature and circumstances of subsequent use of the conditioned catalyst. Thus, using fluid catalyst technique, a finely divided catalyst having an approximate size in the range of 200 to 325 mesh would be employed. For various other forms of operation, the particle size would be appreciably larger, generally in the range of from 100 to 6 mesh. A convenient particle size for the operation hereinafter described is between about 10 and about 30 mesh.

The amount of quench liquid employed is large in comparison to the quantity of catalyst being conditioned. Thus, the volume of quench liquid is generally such that the temperature of the liquid body as a whole is not appreciably raised upon contact with the hot catalyst particles to result in undue vaporization thereof. Under the usual conditions of operation, it is desirable to maintain an inert atmosphere, such as carbon dioxide or nitrogen, over the supply of quenching liquid, thereby minimizing the possible fire hazard.

After contact with quenching liquid has been made, the conditioned catalyst particles are removed from the quench bath and excess adhering liquid is permitted to drain off. The catalyst may then be stored or transferred to the reactors while moist with quench liquid. Unlike the conventionally reduced catalyst, the wet catalyst particles obtained by the present method are not pyrophoric and the instant catalyst accordingly may be in contact with air without instituting the precautions necessary in the previously employed methods.

The catalyst conditioning procedure of this invention may be carried out either as a batch operation or on a continuous basis. A suitable continuous method of operation is shown, in diagrammatic form, by the attached drawing. Referring more particularly to this drawing, the metal oxide catalyst, in particle form, is introduced into hopper 10 and flows downwardly through conduit 11. An inert seal gas under slight pressure is fed into conduit 11 through pipe 12, preventing the upward flow of gaseous products therethrough and diluting the affects of any air which may have been introduced along with the catalyst. The particles of catalyst are heated to an elevated temperature of at least about 900° C. upon passing through the restricted zone between heating coils 13 and 13'. The hot catalyst thereafter falls into a quenching bath 14 of a liquid which is thermally decomposable, yielding a gaseous reducing atmosphere. This liquid is contained in tank 15. An inclined moving belt 16 passes through the quenching bath transporting the reduced catalyst particles upward and out of the bath. The moving belt is suitably fabricated of a porous or sieve-like material which permits liquid adhering to the surface of emerging particles to drain back into the quenching bath during the course of upward movement. Upon reaching the top of the incline, the catalyst particles are discharged from the belt and fall by gravity through column 17 from which they may be conducted to catalyst storage or directly to the reactors.

An inert gas, such as nitrogen or carbon dioxide, is introduced into column 17 through pipe 18 and flows upward, serving to maintain an inert atmosphere over the quenching liquid and to sweep out gaseous decomposition products through outlet 19. The moving belt continuously passes through the quenching bath being guided by rollers 20. The entire system is encased by shell 21 so that the process is carried out in the absence of any contaminating atmosphere. This continuous method of operation affords a rapid and effective means for conditioning the metal oxide catalysts discussed hereinabove.

The following specific examples will serve to illustrate the process of this invention without limiting the same.

EXAMPLE 1

A typical synthetic ammonia catalyst of fused promoted magnetite having the following composition:

| | Weight percent |
|---|---|
| $Fe_3O_4$ | 96.2 |
| $Al_2O_3$ | 2.7 |
| $K_2O$ | 1.1 | was conditioned by the following procedure.

Nine hundred sixty grams (about 370 milliliters) of the above catalyst oxide having a particle size of between 12 and 30 mesh was placed in an iron box and heated in a furnace for about 2 hours to a maximum temperature of 980° C. The box and contents were then removed from the furnace and the catalyst oxide was quickly poured from the box into a vessel containing approximately 2 gallons of denatured alcohol (90% ethanol and 10% methanol). To minimize fire hazard, an atmosphere of carbon dioxide was maintained above the alcohol. Excess alcohol was immediately drained from the catalyst particles and the solid particles further partially drained on a Büchner funnel.

In the moist state there was an increase in apparent volume as a result of the quench. Of the 370 milliliters of catalyst originally charged, it was estimated that about 50 milliliters were lost through spillage, adherence to the box, etc.; yet, the apparent volume of the quenched product obtained in the moist state was about 425 milliliters. The quench-reduced catalyst had become less reflective and was dull grey in color. Microscopic examination indicated the presence of fissures in the catalyst surface apparently due to the thermal shock involved upon quenching.

Activity tests carried out with the above conditioned catalyst and also with a conventionally hydrogen-reduced catalyst of the same composition were made in a static bed apparatus using about 200 milliliters of catalyst disposed in an annular column about 30 inches long with an outer diameter of about ¾ inch and an inner diameter of about ⅛ inch. Close temperature control was obtained with a vapor heat transfer system, and carefully desulfurized synthesis gas was employed. The results of these activity tests carried out at a pressure of 300 pounds per square inch gage and employing a synthesis gas having a hydrogen-to-carbon monoxide ratio of 2.08 are summarized in Table I below:

Table I

|  | Alcohol-Quench-Reduced Catalyst | | H₂ Reduced (95% Reduction) Catalyst | | | | |
|---|---|---|---|---|---|---|---|
| Temp., °C | 305 | 295 | 231 | 235 | 239 | 254.5 | 264 |
| Space Velocity (Volumes of gas/volume of catalyst/hour) | 584 | 592 | 600 | 600 | 600 | 600 | 600 |
| Hours, Test | 20 | 40 | 24 | 20 | 24 | 24 | 24 |
| Reaction Data: | | | | | | | |
| Vol. Contraction, Percent | 50.3 | 24.0 | 32.1 | 41.6 | 41.6 | 44.6 | 49.1 |
| CO Conversion, Percent | 95.0 | 42.4 | 67.3 | 66.8 | 86.5 | 91.2 | 95.9 |
| Product Yields, g/N cu. m.: | | | | | | | |
| C₃–C₄ | 21.8 | 9.0 | 24.3 | 16.7 | 23.7 | 30.5 | 32.7 |
| Gasoline: C₅ to 400° F., EP | 41.4 | 16.3 | 24.4 | 26.2 | 34.0 | 53.6 | 47.2 |
| Diesel: 400° to 700° F | 18.0 | 2.6 | 11.6 | 13.3 | 14.6 | 14.7 | 14.7 |
| Residues: >700° F | 23.5 | 6.5 | 16.1 | 20.2 | 18.1 | 12.6 | 10.2 |
| Total useful yield | 104.7 | 34.4 | 76.4 | 76.2 | 90.4 | 111.4 | 104.8 |
| By-Products: | | | | | | | |
| C₁–C₂ | 21.1 | 12.8 | 13.5 | 11.8 | 17.8 | 25.7 | 23.5 |
| Oxygenates in H₂O layer | 9.2 | 1.3 | 3.6 | 3.3 | 4.6 | 6.9 | 7.9 |
| Total Organics | 135.0 | 48.5 | 93.5 | 91.3 | 112.8 | 144.0 | 136.2 |
| H₂O | 66.8 | 13.8 | 45.7 | 47.3 | 54.0 | 64.3 | 73.3 |
| CO₂ | 224.0 | 94.0 | 133.0 | 165.3 | 220.0 | 223.0 | 217.0 |

From the foregoing table, it will be seen that the liquid quench-reduced catalyst showed excellent synthesis activity for fuels under normal synthesis conditions.

That the alcohol quench reduction had activated the catalyst for synthesis was substantiated by similar tests using the same catalyst oxide with no activating treatment whatsoever. Synthesis gas having a hydrogen to carbon monoxide ratio of 0.8 was passed over the unreduced catalyst oxide, employing a space velocity of 150 volumes of gas per volume of catalyst per hour for a total of 212 hours at temperatures increased in about 10° C. steps from 185° C. to 300° C. Only negligible amounts of product were obtained under such conditions. In the next 24 hours at a temperature of 332° C., there was a noticeable amount of product, 0.125 gram per hour including water, and slightly higher gas contraction, CO conversion, and CO₂ formation. This experiment was concluded with 65 hours treatment at 354° C. where crude product increased to 2.1 grams per hour and gaseous contraction, CO conversion, and CO₂ in the exit gas all increased to 59%, 92%, and 51%, respectively. These data are compatible with the explanation of a slow reduction of the iron oxide by the synthesis gas over the prolonged test period with the iron produced by the reduction acting principally as catalyst for the reaction: $2CO \rightarrow CO_2 + C$.

EXAMPLE 2

Six hundred grams (about 250 milliliters) of the catalyst employed in Example 1, having a particle size of between 12 and 30 mesh, were heated to a temperature of 1260° C. and quickly quenched by pouring into a bath of gasoline having an A. P. I. gravity of 61.8° and a boiling point of up to 375° F. The quench bath of gasoline was provided with a carbon dioxide blanket to minimize fire hazard. The catalyst was removed from the gasoline bath and tested for activity along with a conventionally hydrogen-reduced catalyst of the same composition.

In these comparative tests, about 50 grams of catalyst were used. The test was carried out at atmospheric pressure under carefully controlled temperature conditions. The synthesis gas used was one having a hydrogen-to-carbon monoxide ratio of about 0.8. The space velocity was 160 volumes of gas per volume of catalyst per hour. The volume contraction taken with the CO₂ formed was used as a convenient measure of catalyst activity. The comparative results obtained are set forth in Table II below:

The data of the above table show that the gasoline quench-reduced catalyst is more active at the lower temperature (188° C.) test level than the hydrogen-reduced catalyst. In both cases the contraction relative to the carbon dioxide formed indicates that the synthesis was proceeding rather than decomposition of CO to CO₂ and carbon, as was the case with the unreduced oxide described in Example 1. The carbon dioxide production with the gasoline quench-reduced catalyst is exceptionally low, particularly considering the relatively high contraction.

At the higher temperature level (218° C.) to which the catalysts were then subjected, both catalysts increased in activity, but the gasoline quench-reduced catalyst did not decrease in activity with time of test, whereas the activity of the normally hydrogen-reduced catalyst slowly fell off. Again, the low CO₂ production of the gasoline quench-reduced catalyst is unusual.

While a promoted magnetite catalyst was used in the above examples, the process of this invention is likewise applicable to the conditioning of other metal oxides which are catalytically active after gaseous reduction in the conversion of carbon monoxide-hydrogen mixtures to hydrocarbons and oxygenated organic compounds. In particular, oxides of the ferromagnetic metals, i. e., iron, cobalt, and nickel, may be conditioned by the method described herein. Also, the conditioning of other metal oxides, such as those of copper, may be effected by the procedure of this invention. The activity of these metal oxides may be enhanced by the addition of conventional promoters, such as various compounds of alkali metals or the oxides of difficultly reducible metals, such as aluminum, chromium, and others in minor proportions of about 0.5 to 10% by weight.

It will further be understood that suitable quenching liquids include those capable of yielding a gaseous reducing atmosphere upon thermal decomposition at temperatures of the hot catalyst. Thus, satisfactory quench-reduction liquids include hydrocarbons pyrolized into H₂, C and lower hydrocarbons; alcohols, the pyrolitic decomposition products of which include H₂, CO, aldehydes, etc.; and liquid ammonia, yielding thermal decomposition products of 3 volumes of hydrogen and 1 volume of nitrogen.

It is to be understood that the above description is merely illustrative of preferred embodiments of the invention, of which many variations may be made within

Table II

|  | Gasoline-Quench-Reduced Catalyst | | | | H₂-Reduced (93% Reduced) Catalyst | | | |
|---|---|---|---|---|---|---|---|---|
| Temp., °C | 188 | | 218 | | 188 | | 218 | |
| Test Time Period, Hours | 0–4 | 4–10 | 10–16 | 34–40 | 0–4 | 4–10 | 16–22 | 40–46 |
| Average Percent Vol. Contraction For Test Time Period | 11.1 | 12.2 | 13.8 | 14.5 | 5.6 | 4.2 | 13.9 | 11.0 |
| Average Percent CO₂ Formed for Test Time Period | 0.06 | 0.04 | 0.15 | 0.10 | 1.5 | 0.8 | 4.5 | 3.5 |

I claim:

1. In a method for reducing a metal oxide selected from the group consisting of an oxide of iron, cobalt, and nickel prior to use thereof as a Fischer-Tropsch catalyst for catalytic conversion of carbon monoxide-hydrogen mixtures to hydrocarbons and oxygenated organic compounds, the improvement which comprises heating said metal oxide to a temperature above about 900° C., but below the melting point thereof, introducing the hot metal oxide into a quantity of a quenching liquid of an organic compound having an atom ratio of hydrogen to carbon not exceeding about 3 and capable of yielding a gaseous reducing atmosphere upon thermal decomposition at temperatures of the hot metal oxide, said quantity being sufficiently large to afford an amount of a gaseous reducing atmosphere upon said thermal decomposition of a portion of said quenching liquid at temperatures of the hot metal oxide to effect surface reduction of said oxide during the interval of initial contact thereof with said quenching liquid, and thereafter removing the reduced metal oxide from said quenching liquid.

2. In a method for reducing a metal oxide selected from the group consisting of an oxide of iron, cobalt, and nickel prior to use thereof as a Fischer-Tropsch catalyst for catalytic conversion of carbon monoxide-hydrogen mixtures to hydrocarbons and oxygenated organic compounds, the improvement which comprises heating said metal oxide in particle form to a temperature of at least about 900° C., but below the melting point thereof, introducing the hot metal oxide into a quantity of a quenching liquid of an organic compound having an atom ratio of hydrogen to carbon not exceeding about 4 and capable of yielding a gaseous reducing atmosphere upon thermal decomposition at temperatures of the hot metal oxide, said quantity being sufficiently large to afford an amount of a gaseous reducing atmosphere upon said thermal decomposition of a portion of said quenching liquid at temperatures of the hot metal oxide to effect surface reduction of said oxide during the interval of initial contact thereof with said quenching liquid, and thereafter removing the reduced metal oxide from said quenching liquid.

3. In a method for reducing an iron oxide prior to use thereof as a Fischer-Tropsch catalyst for catalytic conversion of carbon monoxide-hydrogen mixtures to hydrocarbons and oxygenated organic compounds, the improvement which comprises heating said iron oxide in particle form to a temperature of at least about 900° C., but below the melting point thereof, introducing the hot iron oxide into a quenching liquid of an organic compound having an atom ratio of hydrogen to carbon not exceeding about 4 and capable of yielding a gaseous reducing atmosphere upon thermal decomposition at temperatures of the hot iron oxide, said quantity being sufficiently large to afford an amount of a gaseous reducing atmosphere upon said thermal decomposition of a portion of said quenching liquid at temperatures of the hot iron oxide to effect surface reduction of said oxide during the interval of initial contact thereof with said quenching liquid, and thereafter removing the reduced iron oxide from said quenching liquid.

4. In a method for reducing a promoted magnetite catalyst prior to use thereof in the synthesis of hydrocarbons and oxygenated organic compounds from CO and $H_2$, the improvement which comprises heating said magnetite to a temperature within the range of about 900° C. to about 1500° C., introducing the hot magnetite into a quantity of a quenching liquid of an organic compound having an atom ratio of hydrogen to carbon not exceeding about 4 and capable of yielding a gaseous reducing atmosphere upon thermal decomposition at temperatures of the hot magnetite, said quantity being sufficiently large to afford an amount of a gaseous reducing atmosphere upon said thermal decomposition of a portion of said quenching liquid at temperatures of the hot magnetite to effect surface reduction of said magnetite during the interval of initial contact thereof with said quenching liquid, and thereafter removing the catalyst from said quenching liquid.

5. In a method for reducing a metal oxide selected from the group consisting of an oxide of iron, cobalt, and nickel prior to use thereof as a Fischer-Tropsch catalyst for catalytic conversion of carbon monoxide-hydrogen mixtures to hydrocarbons and oxygenated organic compounds, the improvement which comprises heating said metal oxide to a temperature above about 900° C., but below the melting point thereof, introducing the hot metal oxide into a quantity of a quenching liquid of an organic compound having an atom ratio of hydrogen to carbon not exceeding about 3 and capable of yielding a gaseous reducing atmosphere upon thermal decomposition at temperatures of the hot metal oxide, said quantity being sufficiently large to afford an amount of a gaseous reducing atmosphere upon said thermal decomposition of a portion of said quenching liquid at temperatures of the hot metal oxide to effect surface reduction of said oxide during the interval of initial contact thereof with said quenching liquid, and thereafter removing the reduced metal oxide from said quenching liquid.

6. In a method for reducing a metal oxide selected from the group consisting of an oxide of iron, cobalt, and nickel prior to use thereof as a Fischer-Tropsch catalyst for catalytic conversion of carbon monoxide-hydrogen mixtures to hydrocarbons and oxygenated organic compounds, the improvement which comprises heating said metal oxide to a temperature above about 900° C., but below the melting point thereof, quenching the hot metal oxide with a sufficiently large quantity of a liquid hydrocarbon mixture capable of yielding a gaseous reducing atmosphere upon thermal decomposition at temperatures of the hot metal oxide to afford an amount of a gaseous reducing atmosphere upon said thermal decomposition of a portion of said liquid hydrocarbon mixture at temperatures of the hot metal oxide to effect surface reduction of said oxide during the interval of initial contact thereof with said liquid hydrocarbon mixture, and thereafter removing the reduced metal oxide from said liquid hydrocarbon mixture.

7. In a method for reducing a metal oxide selected from the group consisting of an oxide of iron, cobalt, and nickel prior to use thereof as a Fischer-Tropsch catalyst for catalytic conversion of carbon monoxide-hydrogen mixtures to hydrocarbons and oxygenated organic compounds, the improvement which comprises heating said metal oxide to a temperature above about 900° C., but below the melting point thereof, quenching the hot metal oxide with a sufficiently large quantity of a liquid alcohol mixture capable of yielding a gaseous reducing atmosphere upon thermal decomposition at temperatures of the hot metal oxide to afford an amount of a gaseous reducing atmosphere upon said thermal decomposition of a portion of said liquid alcohol mixture at temperatures of the hot metal oxide to effect surface reduction of said oxide during the interval of initial contact thereof with said liquid alcohol mixture, and thereafter removing the reduced metal oxide from said liquid alcohol mixture.

8. In a method for reducing a metal oxide selected from the group consisting of an oxide of iron, cobalt, and nickel prior to use thereof as a Fischer-Tropsch catalyst for catalytic conversion of carbon monoxide-hydrogen mixtures to hydrocarbons and oxygenated organic compounds, the improvement which comprises heating said metal oxide to a temperature above about 900° C., but below the melting point thereof, quenching the hot metal oxide with a sufficiently large quantity of gasoline to afford an amount of a gaseous reducing atmosphere upon thermal decomposition of a portion of the gasoline at temperatures of the hot metal oxide to effect surface reduction of said oxide during the interval of initial contact thereof with the gasoline, and thereafter removing the reduced metal oxide from the gasoline.

9. In a method for reducing a metal oxide selected from the group consisting of an oxide of iron, cobalt, and nickel prior to use thereof as a Fischer-Tropsch catalyst for catalytic conversion of carbon monoxide-hydrogen mixtures to hydrocarbons and oxygenated organic compounds, the improvement which comprises heating said metal oxide to a temperature above about 900° C., but below the melting point thereof, quenching the hot metal oxide with a sufficiently large quantity of denatured alcohol to afford an amount of a gaseous reducing atmosphere upon thermal decomposition of a portion of the denatured alcohol at temperatures of the hot metal oxide to effect surface reduction of said oxide during the interval of initial contact thereof with the denatured alcohol, and thereafter removing the reduced metal oxide from the denatured alcohol.

10. In a method for reducing a metal oxide selected from the group consisting of an oxide of iron, cobalt, and nickel prior to use thereof as a Fischer-Tropsch catalyst for catalytic conversion of carbon monoxide-hydrogen mixtures to hydrocarbons and oxygenated organic compounds, the improvement which comprises heating said metal oxide to a temperature above about 900° C., but below the melting point thereof, quenching the hot metal oxide with a sufficiently large quantity of liquid ammonia to afford an amount of a gaseous reducing atmosphere upon thermal decomposition of a portion of the liquid ammonia at temperatures of the hot metal oxide to effect surface reduction of said oxide during the interval of initial contact thereof with the liquid ammonia, and thereafter removing the reduced metal oxide from the liquid ammonia.

11. In a method for reducing an iron oxide prior to use thereof as a Fischer-Tropsch catalyst for catalytic conversion of carbon monoxide-hydrogen mixtures to hydrocarbons and oxygenated organic compounds, the improvement which comprises heating said iron oxide to a temperature above about 900° C., but below the melting point thereof, quenching the hot iron oxide with a sufficiently large quantity of a liquid hydrocarbon mixture capable of yielding a gaseous reducing atmosphere upon thermal decomposition at temperatures of the hot iron oxide to afford an amount of a gaseous reducing atmosphere upon said thermal decomposition of a portion of said liquid hydrocarbon mixture at temperatures of the hot iron oxide to effect surface reduction of said oxide during the interval of initial contact thereof with said liquid hydrocarbon mixture, maintaining an inert atmosphere above the surface of said liquid hydrocarbon mixture, and thereafter removing the reduced iron oxide from said liquid hydrocarbon mixture.

12. In a method for reducing an iron oxide prior to use thereof as a Fischer-Tropsch catalyst for catalytic conversion of carbon monoxide-hydrogen mixtures to hydrocarbons and oxygenated organic compounds, the improvement which comprises heating said iron oxide to a temperature above about 900° C., but below the melting point thereof, quenching the hot iron oxide with a sufficiently large quantity of a liquid alcohol mixture capable of yielding a gaseous reducing atmosphere upon thermal decomposition at temperatures of the hot iron oxide to afford an amount of a gaseous reducing atmosphere upon said thermal decomposition of a portion of said liquid alcohol mixture at temperatures of the hot iron oxide to effect surface reduction of said oxide during the interval of initial contact thereof with said liquid alcohol mixture, maintaining an inert atmosphere above the surface of said liquid alcohol mixture, and thereafter removing the reduced iron oxide from said liquid alcohol mixture.

13. A continuous method for reducing a metal oxide selected from the group consisting of an oxide of iron, cobalt, and nickel prior to use thereof as a Fischer-Tropsch catalyst for catalytic conversion of carbon monoxide-hydrogen mixtures to hydrocarbons and oxygenated organic compounds, which comprises continuously passing particles of said metal oxide through a heating zone wherein the oxide is heated to a temperature of at least about 900° C., but below the melting point thereof, continuously introducing the heated metal oxide into a quantity of a quenching liquid of an organic compound having an atom ratio of hydrogen to carbon not exceeding about 4 and capable of yielding a gaseous reducing atmosphere upon thermal decomposition at temperatures of the hot metal oxide, said quantity being sufficiently large to afford an amount of a gaseous reducing atmosphere upon said thermal decomposition of a portion of said quenching liquid at temperatures of the hot metal oxide to effect surface reduction of said oxide during the interval of initial contact thereof with said quenching liquid and continuously withdrawing the quench-reduced metal oxide from said quenching liquid.

14. A continuous method for reducing a metal oxide selected from the group consisting of an oxide of iron, cobalt, and nickel prior to use thereof as a Fischer-Tropsch catalyst for catalytic conversion of carbon monoxide-hydrogen mixtures to hydrocarbons and oxygenated organic compounds, which comprises continuously passing particles of said metal oxide through a heating zone wherein the oxide is heated to a temperature of at least about 900° C., but below the melting point thereof, continuously introducing the hot metal oxide into a quantity of a quenching liquid of an organic compound having an atom ratio of hydrogen to carbon not exceeding about 4 and capable of yielding a gaseous reducing atmosphere upon thermal decomposition at temperatures of the hot metal oxide, said quantity being sufficiently large to afford an amount of a gaseous reducing atmosphere upon said thermal decomposition of a portion of said quenching liquid at temperatures of the hot metal oxide to effect surface reduction of said oxide during the interval of initial contact thereof with said quenching liquid, continuously blowing an inert gas over the surface of said quenching liquid, continuously withdrawing gaseous liquid decomposition products from the atmosphere overlying said quenching liquid and continuously removing the quench-reduced metal oxide particles from said quenching liquid.

15. A continuous method for reducing an iron oxide prior to use thereof as a Fischer-Tropsch catalyst for catalytic conversion of carbon monoxide-hydrogen mixtures to hydrocarbons and oxygenated organic compounds, which comprises continuously passing said iron oxide in particle form through a heating zone wherein the iron oxide is heated to a temperature of at least about 900° C., but below the melting point thereof, continuously quenching the heated iron oxide by introducing the same into a sufficiently large quantity of a liquid hydrocarbon to afford an amount of a gaseous reducing atmosphere upon thermal decomposition of a portion of said liquid hydrocarbon at temperatures of the hot iron oxide to effect surface reduction of said oxide during the interval of initial contact thereof with said liquid hydrocarbon and continuously withdrawing the resulting quench-reduced iron oxide from said liquid hydrocarbon.

16. A continuous method for reducing an iron oxide prior to use thereof as a Fischer-Tropsch catalyst for catalytic conversion of carbon monoxide-hydrogen mixtures to hydrocarbons and oxygenated organic compounds, which comprises continuously passing said iron oxide in particle form through a heating zone wherein the iron oxide is heated to a temperature of at least about 900° C., but below the melting point thereof, continuously quenching the heated iron oxide by introducing the same into a sufficiently large quantity of an alcohol to afford an amount of a gaseous reducing atmosphere upon thermal decomposition of a portion of said alcohol at temperatures of the hot iron oxide to effect surface reduction of said oxide during the interval of initial contact thereof with said alcohol and continuously withdrawing the resulting quench-reduced iron oxide from said alcohol.

17. An improved process for synthesizing valuable conversion products from CO and $H_2$ in the presence of a Fischer-Tropsch catalyst, which comprises contacting a gas containing CO and $H_2$ in synthesis proportions at synthesis conditions with a metal oxide catalyst selected from the group consisting of an oxide of iron, cobalt, and nickel which has been reduced by heating at a temperature of at least about 900° C., but below the melting point thereof, and thereafter introduced into a quantity of a quenching liquid of an organic compound having an atom ratio of hydrogen to carbon not exceeding about 4 and capable of yielding a gaseous reducing atmosphere upon thermal decomposition at temperatures of the hot metal oxide, said quantity being sufficiently large to afford an amount of a gaseous reducing atmosphere upon said thermal decomposition of a portion of said quenching liquid at temperatures of the hot metal oxide to effect surface reduction of said oxide during the interval of initial contact thereof with said quenching liquid.

18. An improved process for synthesizing valuable conversion products from CO and $H_2$ in the presence of an iron oxide catalyst, which comprises contacting a gaseous feed containing CO and $H_2$ in synthesis proportions at synthesis conditions with an iron oxide catalyst which has been reduced by heating to a temperature above about 900° C., but below the melting point thereof, and thereafter quenched with a quantity of an organic liquid having an atom ratio of hydrogen to carbon not exceeding about 3 and capable of yielding a gaseous reducing atmosphere upon thermal decomposition at temperatures of the hot iron oxide, said quantity being sufficiently large to afford an amount of a gaseous reducing atmosphere upon said thermal decomposition of a portion of said organic liquid at temperatures of the hot iron oxide to effect surface reduction of said oxide during the interval of initial contact thereof with said organic liquid.

References Cited in the file of this patent

UNITED STATES PATENTS

| Number | Name | Date |
|---|---|---|
| 1,156,068 | Ellis | Oct. 12, 1915 |
| 1,329,322 | Ellis | Jan. 27, 1920 |
| 1,329,323 | Ellis | Jan. 27, 1920 |
| 1,378,337 | Ellis | May 17, 1921 |
| 2,287,891 | Linckh | June 30, 1942 |
| 2,543,327 | McGrath et al. | Feb. 27, 1951 |

FOREIGN PATENTS

| Number | Country | Date |
|---|---|---|
| 4,023 | Great Britain | Mar. 13, 1916 |